United States Patent Office 3,137,853
Patented June 16, 1964

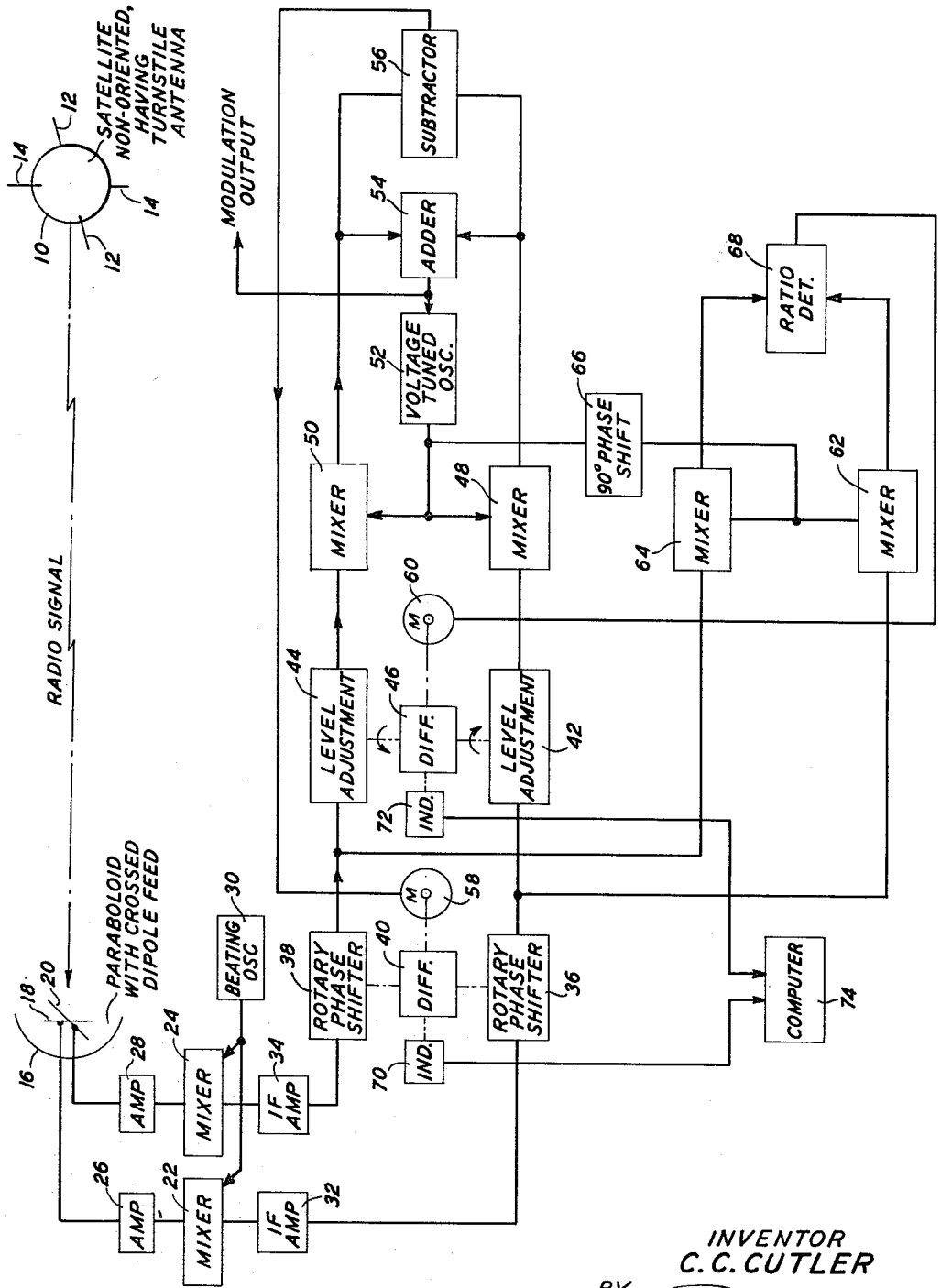

3,137,853
POLARIZATION MEASUREMENT FOR DETERMINATION OF THE ATTITUDE OF SATELLITE VEHICLES
Cassius C. Cutler, Gillette, N.J., assignor to Bell Telephone Laboratories, Incorporated, New York, N.Y., a corporation of New York
Filed Jan. 4, 1960, Ser. No. 204
7 Claims. (Cl. 343—100)

This invention relates to systems for determining the orientation or attitude of a remote source of radio signals and more particularly to base station systems for determining the attitude of remote space satellite vehicles.

Space satellite vehicles have been proposed for a wide variety of applications, many of which require that the attitude or spatial orientation of the vehicle be known or determinable at the location of a base or control station. In a typical satellite vehicle application in which this problem is involved, the satellite vehicle is employed as the repeater station of a radio relay system and carries one or more antennas which, for efficient utilization, must be maintained in known orientation with respect to the transmitting and receiving stations between which radio signals are to be transmitted. While there have been a number of proposals in accordance with which the attitude of a space vehicle may be changed in response to signals directed to the space vehicle from a control station, such signals cannot be produced unless the existing attitude of the satellite is known or determinable.

It is possible in some instances to program the actions of the satellite vehicle from the time of launch and placement in orbit so that the attitude is known in a manner analogous to the dead-reckoning system often employed for the navigation of surface vessels. However, in many applications this cannot be accomplished, at least not with sufficient accuracy over a long period of time, and remote control of satellite attitude or of antennas mounted on the satellite must rest on some method of continuously determining the existing attitude of the vehicle.

Heretofore, numerous attitude control systems have been proposed but these all appear to require the provision of considerable special equipment of the satellite vehicle with the attendant penalties as to space and weight required. It is accordingly the object of the present invention to permit determination at a remote point of the attitude of a satellite vehicle or other source of radiated signals without increasing the complexity of the vehicle beyond that required for other reasons.

According to the invention, the attitude of a remote source of signals is determined by measurement of the polarization of signals which may be radiated from the vehicle or source for other purposes as, for example, for communication between the vehicle and the transmitting and receiving stations of a radio relay system. To this end, the signals radiated from the satellite vehicle are radiated in quadrature as linearly polarized signals in orthogonal planes of polarization. Depending upon the orientation of the satellite vehicle, the signals received at a ground or control terminal will have a polarization which is generally elliptical but which may be plane or circular, depending upon the orientation of the satellite as seen from the base station. This polarization is measured by receiving components of the signal energy in orthogonal planes intersecting along the line of sight to the source and operating upon the two components to demodulate and combine them efficiently. From the adjustments in the phases and amplitudes of the two components required to accomplish efficient combination and demodulation, quantities may be derived from which the orientation of a reference axis of the satellite may be determined. At the same time, the combined signal components obtained provide a form of diversity transmission and may be treated, as by conventional detection, to yield the modulation upon the signals generated at the remote source and radiated therefrom.

The general arrangement outlined above may be essentially duplicated with a second pair of dipoles mounted on the satellite and excited at a different frequency. The polarized radiation from this second pair of dipoles may be received and treated in the same manner as that from the first to yield orientation information for a second reference axis on the satellite, thus providing additional information from which the orientation of the satellite vehicle may be determined with reduced uncertainty.

The above and other features of the invention will be considered in the following specification taken in connection with the drawing, the single figure of which is a schematic block diagram of a system, according to the invention, for determining the attitude of a remote source of radio frequency signals.

As indicated above, the signal components received in orthogonal planes from one pair of dipoles on the satellite vehicle are combined for the highest possible efficiency in signal detection. In order to accomplish this, it is necessary to adjust the phases of the components to equality and to adjust the amplitudes to an optimum relationship. This last relationship is that which results in the greatest ratio of response or demodulated signal to output noise, regardless of the polarization of the received signal. The required relationship may best be explained in terms of a simple example.

Assume a pair of circuits and a given signal power which may be divided in any ratio between them. Assume, also, that noise is present with the same amplitude or power in the two circuits. In general, the best signal-to-noise ratio will be obtained in the combined output when the output of one of the circuits is attenuated with respect to that of the other. Suppose that the first of the two circuits has a signal power $P_1$ and a noise power $N_1$ and that the second circuit has a signal power $P_2$ which is in phase with $P_1$ and a random noise power $N_2$ which is equal in amplitude but uncorrelated with $N_1$. This is the situation which will obtain after the phases of the two signal components have been adjusted to equality.

Now, suppose that the amplitudes in the two circuits are adjusted by a differential gain or attenuation such that $P_1$ and $N_1$ are attenuated by a proportion $A$ compared to $P_2$ and $N_2$. Then, if the signals are combined, the signal output will have a signal power.

$$P_3 = (\sqrt{AP_1} + \sqrt{P_2})^2$$

because the voltages add in phase.

Since the noise power is uncorrelated, however, the noise power output is $$N_3 = AN_1 + N_2 = N_1(A+1)$$

and the output signal-to-noise ratio is therefore $$\frac{P_3}{N_3} = \frac{(\sqrt{AP_1} + \sqrt{P_2})^2}{N_1(A+1)}$$

To get the greatest signal-to-noise ratio in the output, the value of $A$ must be chosen to maximize the last expression given above. This can be obtained by differentiating the last expression with respect to $A$ and setting the result equal to zero in the usual manner. This gives $$A = \frac{P_1}{P_2}$$

as the best attenuation ratio and yields a signal-to-noise ratio for the combined output of $$\frac{P_3}{N_3} = \frac{P_1 + P_2}{N_1}$$

Significantly, this is dependent upon the total signal power available but not at all upon the division of power between the two circuits. Also, it should be noted that the weaker of the two signals is attenuated before combining.

There are many practical circuits which could be used to perform such adjustment and combination of the two components received from the satellite vehicle referred to above. The one to be described, by way of example, combines the amplitude control function with a carrier-suppression detector and phase equalizer in order to take advantage of the noise and interference discrimination available with this circuit.

The system shown in the drawing is designed to permit determination of the orientation of a remote source of radio signals such as a space satellite vehicle, which is indicated at 10 in the upper right-hand corner of the drawing. This vehicle, or other remote source of radio signals, is provided with antennas or radiators which produce signal energies which are linearly polarized in orthogonal planes. As shown in the drawing, the radiator system of the vehicle comprises paired, crossed dipoles 12 and 14 and it may be postulated that these dipole pairs are excited by the same radio frequency signal but in phase quadrature. The radio frequency signal employed may be a continuous wave signal as would be the case if the system were required only to determine the attitude of the vehicle or, as would more normally be the case, may be a carrier modulated by message information. This latter circumstance would occur, for example, when the signals to be transmitted over a radio relay system by way of the satellite are employed also for determination of the attitude of the satellite. The arrangement shown is designed for use when the carrier is frequency modulated by message information.

In either event, the signals radiated from the satellite vehicle, when arranged as discussed above, have a polarization which, in the usual case, is elliptical and with a degree of, and axes of, ellipticity which are different in different directions. In particular, the polarization is circular along an axis perpendicular to the dipoles and linear in the plane of the dipoles, and will have varying degrees of ellipticity at intermediate directions. It will be apparent that from the geometry of the system, including the satellite vehicle or other remote source and a remote base station, the orientation of the vehicle with respect to the line of sight from the vehicle to the base station and with respect to a vertical plane may be determined from measurements of the polarization of the energy received at the base station. Accordingly, the base station is provided with a receiving antenna 16 having crossed dipole radiators 18 and 20 and is oriented in such a way that the planes of polarization to which dipoles 18 and 20 are responsive with greatest efficiency intersect along the line of sight from the base station to the remote source of energy.

Separate signal channels are provided and conduct energies received by dipoles 18 and 20, respectively, to mixers 22 and 24. As shown, these channels may, if necessary, include radio frequency amplifiers 26 and 28 to provide a necessary signal level at the inputs to the two mixers. In mixers 22 and 24, the two signal components are combined with the outputs of a beating oscillator 30, the frequency of which is chosen with respect to that of the signal generator within the vehicle to yield outputs at a convenient intermediate frequency. The outputs of mixers 22 and 24 respectively are applied by way of intermediate frequency amplifiers 32 and 34 to rotary phase shifters 36 and 38. These phase shifters are interconnected by way of mechanical differential 40 so that differential adjustments may be made in the phases of the signals in the two channels to yield a condition in which the two signals are accurately in phase with one another.

After such adjustment to phase equality, the signal components in the two channels are applied respectively to level-adjusting devices 42 and 44, which may take the form of gain-controlled amplifiers. Conveniently, these amplifiers are provided with mechanical gain-control devices which, as in the case of the rotary phase shifters 36 and 38, are linked by a mechanical differential 46. Here, too, appropriate adjustment may be made to change the amplitudes of the signals in the two channels as they appear at the output of level-adjusting devices 42 and 44. It will be understood that because of the nature of the differential-adjusting devices thus far mentioned, such adjustments are necessarily slow and cannot be carried out at sufficiently high frequencies to destroy whatever message modulation may be present on the radio frequency carrier signals received at antenna 16. In any event, the quantities in the two channels appearing at the outputs of level-adjusting devices 42 and 44 are ideally brought into phase equality and the appropriate amplitude relationship discussed previously and are held there by automatic control means which drive the two differentials 40 and 46, referred to above.

For this purpose, the outputs of the level-adjusting devices 42 and 44 are applied to separate mixers 48 and 50, respectively, and there combined with the output of a voltage-tuned oscillator 52. The frequency of this oscillator is in the range so chosen that it may be tuned to the average intermediate frequency and follows exactly the frequency variations in the signals appearing at the outputs of level-adjusting devices 42 and 44. When this condition exists, the outputs of mixers 48 and 50 will be voltages proportional to the phase deviation of the signal from a mean value and will act to tune the voltage-tuned oscillator to remove the phase difference. This part of the circuit comprises a well-known phase detector which yields an output which is proportional to the frequency excursion of the signal and is an efficient demodulator for frequency modulated signals. For the purpose of controlling oscillator 52, the outputs of mixers 48 and 50 are combined in an adder circuit 54 and applied to the control element of oscillator 52 to adjust the frequency thereof. The same two quantities are subtracted in circuit 56 and yield a direct-current voltage which is zero when the two mixer inputs are in phase and has either a positive or negative value at all other times, the polarity depending upon the sense in which the relative phases of the two components differ. This quantity is applied to a reversible motor 58 which drives differential 40 to control rotary phase shifters 36 and 38. It should be noted that the output of the adder 54 is automatically controlled to a very small value by the servo mechanism described. The outputs of the mixers 48 and 50 are not small, however, unless the relative phases in the two paths are properly adjusted. The only way that the mixer outputs can be other than small, if their sum is small, is for them to be equal in magnitude and opposite in sign, and the operation of the double-servo loop comprised of mixers 48 and 50, adder 54, and oscillator 52 guarantees just this result. To operate the differential phase shifter, the difference between the outputs of mixers 48 and 50 is taken by subtractor 56 and used to control the differential phase shifters 36 and 38. This comprises a second double-servo loop which must be designed with appropriate time constants, through well-known art, to be compatible with the first one. The only way that the conditions imposed by these servo loops can be satisfied is for oscillator 52 to be in quadrature relationship with the signals in both branches of the circuit, which are, in turn, in phase with each other. Any departure from this is a transient condition due to signal modulation, satellite motion, or the like, and is rapidly corrected while giving a voltage output and appropriate control voltages for the servo loops.

Operation of the circuit thus far described is not dependent upon the relative amplitudes of the signal in the two branches, but as has been demonstrated, there is a preferred adjustment of relative signal amplitude which produces optimum discrimination against noise. To this end, it will be recalled that level-adjusting devices 42 and 44 are provided and that they are differentially connected by way of differential 46. This differential is driven by a second reversible motor 60, a control signal for which is derived in the following manner:

Samples of the output signals appearing at the outputs of phase shifters 36 and 38 are applied respectively to mixer circuits 62 and 64, to additional inputs of which is applied to the output of voltage-tuned oscillator 52 shifted in phase through an angle of 90 degrees by a phase shifter 66. Because of the 90 degree phase shift so introduced, the outputs of mixers 62 and 64 will be maximum when the desired condition of frequency and phase coincidence, referred to above, exists. The ratio of these two outputs is determined by a simple comparing circuit 68 and this quantity is applied to control the operation of motor 60. This control is so adjusted that the ratio of the signal powers in the output of the level adjusters is the square of that in the input.

It will be recognized that the circuit arrangements thus far described operate automatically to adjust both the phases and amplitudes of the signal quantities occurring in the two signal channels of the receiver to an optimum relationship. The amount of adjustment required in each of these quantities is related to the polarization of the signals received by antenna 16, and from measurement of the amount of the adjustments required it is possible to determine the orientation of the source from which the signals received on the antenna were generated. Conveniently, the mechanical rotations of differentials 40 and 46 may be converted to electrical form by devices shown in the drawing as indicators 70 and 72, respectively, and these quantities may be applied as the inputs to a computer 74.

The function of computer 74 is to convert the measurements of relative phase and amplitude adjustment required to an indication of the orientation of the signal source and from these values to determine as much as possible about the orientation or attitude of the satellite vehicle. In particular, it is possible to determine the inclination of an axis on the satellite, normal to the two transmitting dipoles, to the line of sight and also to a vertical plane through the line of sight.

The received wave is elliptically polarized and has the following components:

$$E_{\text{Vertical}} = A \sin \omega t$$

$$E_{\text{Horizontal}} = B \cos (\omega t + \Phi)$$

Indicators 70 and 72 respectively provide measurements of the relative phase $\Phi$ and the amplitude ratio $A/B$. The inclination of an axis of the satellite prependicular to the two transmitting dipoles is related to the indicated quantities by the following relationships based upon the geometry of the system. The inclination of the axis to the line of sight to the receiver is $$\theta = \sin^{-1} \sqrt{\frac{B^2 + A^2 - \sqrt{4 A^2 B^2 \sin^2 \Phi + (B^2 - A^2)^2}}{B^2 + A^2 + \sqrt{4 A^2 B^2 \sin^2 \Phi + (B^2 - A^2)^2}}}$$

The projection of the axis on a plane perpendicular to the line of sight makes an angle $\gamma$ with the vertical plane through the line of sight $$\gamma = \tfrac{1}{2} \tan^{-1} \frac{2AB \sin \Phi}{B^2 - A^2}$$

These two angles $\theta$ and $\gamma$ uniquely define the direction of the satellite axis defined above.

The nature of computer 74 is determined by the above equations and the design of the computer itself is immaterial so long as it is arranged to solve these equations to yield the quantities $\gamma$ and $\theta$. Such computers may be designed by well-known principles and are not discussed in detail herein.

It is recognized that determining the direction of an axis in the satellite still leaves rotation about the axis, and the sense (or direction) of the axis undetermined. However, a duplicate of the foregoing arrangement with a second pair of dipoles operating on a different frequency can define a second axis on the satellite, thus removing most of the uncertainty. Variation of the axial direction with time will permit a final unique determination of satellite attitude or, alternatively, three sets of dipoles can be used with the foregoing principles to give a unique measurement at a single instant of time.

What is claimed is:

1. In a system for determining the orientation of a remote source radiating quadrature signals from crossed dipoles, means for receiving energy from said source polarized in orthogonal planes intersecting along the line of sight from said source, means for adjusting the relative amplitudes of the signals received in said planes for maximum signal-to-noise ratio when combined, means for adjusting the relative phases of said signals to equality, means for combining said signals, and computing means responsive to the adjustments required for determining therefrom the orientation of the dipoles of said remote source.

2. In a system for determining the orientation of a remote source radiating message-modulated quadrature signals in orthogonal planes of polarization, means for receiving energy from said source polarized in each of the orthogonal planes intersecting along the line of sight from said source, means for adjusting the amplitudes of the energies received in said planes to occur in a ratio equal to the square of their original ratio, means for adjusting the relative phases of said energy to equality, means for determining from the adjustments required the orientation of said remote source, means for combining the phase and amplitude equalized-energy components, and means for demodulating the combined energies to yield the message information.

3. In a system for determining the orientation of a space satellite having crossed dipole radiators excited in quadrature, a pair of channels respectively accepting with greatest efficiency signal energies polarized in orthogonal planes intersecting along the line of sight from said satellite, means for differentially adjusting the amplitudes of the energies received in said channels to occur in a ratio equal to the square of their original ratio, means for differentially adjusting the phases of the energies in said channels to identity, means for measuring the adjustment required in each case, and means for computing from the amounts of such adjustment the relative orientations of said radiators.

4. In a system for determining the attitude of an earth satellite, crossed dipole radiators mounted on the satellite, means for exciting the individual dipoles in quadrature by a common signal, means at a ground station for measuring energy received from the satellite at orthogonal planes intersecting along the line of sight to the satellite, means for adjusting the relative amplitudes of the energies received in said planes to occur in a ratio equal to the square of their original ratio, means for adjusting the relative phases of the energies received in said planes to equality, and means for computing from the relative amplitude and relative phase adjustments required the spatial orientation of the dipole array on said satellite.

5. In a system for determining the orientation of a remote source radiating quadrature signals from crossed dipoles, a pair of crossed-dipole receiving antennas, a signal channel associated with each of said receiving antennas, means for differentially shifting the phase of energies in said channel, a local oscillator, means for combining signal energies from said channels individually with the output of said oscillator, means for combining the combined signals from said combining means, means for applying the output of said last-mentioned means to control the frequency of said oscillator, means for subtracting said combined signals, means for applying the difference to control the adjustment of said phase-shifting means, an output circuit for said last-mentioned combining means, and means for demodulating signals in said output circuit to yield message information.

6. In a receiver for signals radiated from a remote source in quadrature from crossed dipole radiators, a pair of receiver channels responsive with greatest efficiency to energies polarized in orthogonal planes intersecting along the line of sight to said source, means for differentially shifting the phase of received energies in said channels, a local oscillator, mixer means for combining the outputs of said channels after the action of said differential phase-shifting means with the output of said local oscillator shifted in phase by 90 degrees, means for detecting the ratio of the mixer outputs, means responsive to said ratio for differentially adjusting the amplitudes of the signal energies in said channels at the outputs of said phase-shifting means, means for mixing the amplitude-adjusted energies in said channels with the output of said voltage-tuned oscillator, means for combining the outputs of said last-mentioned mixer means to control said differential phase shifter, and means for deriving from said outputs the message signal modulation.

7. In a receiver for signals radiated from a remote source in quadrature from crossed-dipole radiators, a pair of receiver channels responsive with greatest efficiency to energies polarized in orthogonal planes intersecting along the line of sight to said source, means for differentially shifting the phase of received energies in said channels, a local oscillator, mixer means for combining the outputs of said channels after the action of said differential phase-shifting means with the output of said local oscillator shifted in phase by 90 degrees, means for detecting the ratio of the mixer outputs, means responsive to said ratio for differentially adjusting the amplitudes of the signal energies in said channels at the outputs of said phase-shifting means, means for mixing the amplitude-adjusted energies in said channels with the output of said voltage-tuned oscillator, means for combining the outputs of said last-mentioned mixer, means to control said differential phase shifter, means for deriving from said outputs the message signal modulation, and means for comparing the outputs of said combining means and said ratio-determining means to determine the orientation of said source.

No references cited.